United States Patent
Fleche et al.

(10) Patent No.: US 11,118,652 B2
(45) Date of Patent: Sep. 14, 2021

(54) VIBRATION DAMPER, ASSOCIATED DAMPING MECHANISM AND PROPULSION ASSEMBLY

(71) Applicant: VALEO EMBRAYAGES, Amiens (FR)

(72) Inventors: Benoit Fleche, Amiens (FR); Fabien Lebeau, Amiens (FR); Jerome Boulet, Amiens (FR); Carlos Lopez Perez, Fuenlabrada (ES)

(73) Assignee: VALEO EMBRAYAGES, Amiens (FR)

( * ) Notice: Subject to any disclaimer, the term of this patent is extended or adjusted under 35 U.S.C. 154(b) by 629 days.

(21) Appl. No.: 15/771,448

(22) PCT Filed: Oct. 28, 2016

(86) PCT No.: PCT/EP2016/076163
§ 371 (c)(1),
(2) Date: Oct. 3, 2018

(87) PCT Pub. No.: WO2017/072337
PCT Pub. Date: May 4, 2017

(65) Prior Publication Data
US 2019/0024750 A1    Jan. 24, 2019

(30) Foreign Application Priority Data

Oct. 30, 2015    (FR) ...................................... 1560421

(51) Int. Cl.
*F16F 15/14*    (2006.01)
*F16F 15/133*    (2006.01)

(52) U.S. Cl.
CPC ...... *F16F 15/1333* (2013.01); *F16F 15/1336* (2013.01); *F16F 15/1428* (2013.01); *F16F 2230/0064* (2013.01)

(58) Field of Classification Search
CPC ............... F16F 15/1333; F16F 15/1336; F16F 15/1428; F16F 15/123; F16F 15/1215; F16F 15/121; F16F 2230/0064
See application file for complete search history.

(56) References Cited

U.S. PATENT DOCUMENTS

| | | | |
|---|---|---|---|
| 5,697,261 A | 12/1997 | Mokdad et al. | |
| 9,683,627 B2 | 6/2017 | Boulet et al. | |
| 2015/0369296 A1 | 12/2015 | Lopez-Perez | |

FOREIGN PATENT DOCUMENTS

| | | |
|---|---|---|
| DE | 102010049929 A1 | 5/2011 |
| DE | 102010054303 A1 | 6/2011 |

(Continued)

OTHER PUBLICATIONS

International Search Report dated Feb. 9. 2017, in PCT/EP2016/076163, filed Oct. 28, 2016.

*Primary Examiner* — Luis A Gonzalez
(74) *Attorney, Agent, or Firm* — Oblon, McClelland, Maier & Neustadt, L.L.P.

(57) ABSTRACT

A vibration damper is provided with two rotating members, i.e. an oscillating inertial flywheel and a member to be damped driven by a torque following a torque path between a driving member and a driven member, wherein the inertial flywheel is connected kinematically to the torque path between the driving member and the driven member solely by way of the member to be damped. Connecting modules between the two rotating members permit a relative angular displacement θ between the two rotating members on the two sides of a reference relative angular position. Each connecting module is provided with a roller associated with a first of the two rotating members and a cam track connected resiliently by a resilient element to a second of the two rotating members.

19 Claims, 11 Drawing Sheets

(56) References Cited

FOREIGN PATENT DOCUMENTS

| EP | 2824361 A1 * | 1/2015 | .......... F16F 15/1336 |
|---|---|---|---|
| EP | 2899426 A1 | 7/2015 | |
| WO | WO 2011/006264 A1 | 1/2011 | |
| WO | WO 2014/128380 A1 | 8/2014 | |

* cited by examiner

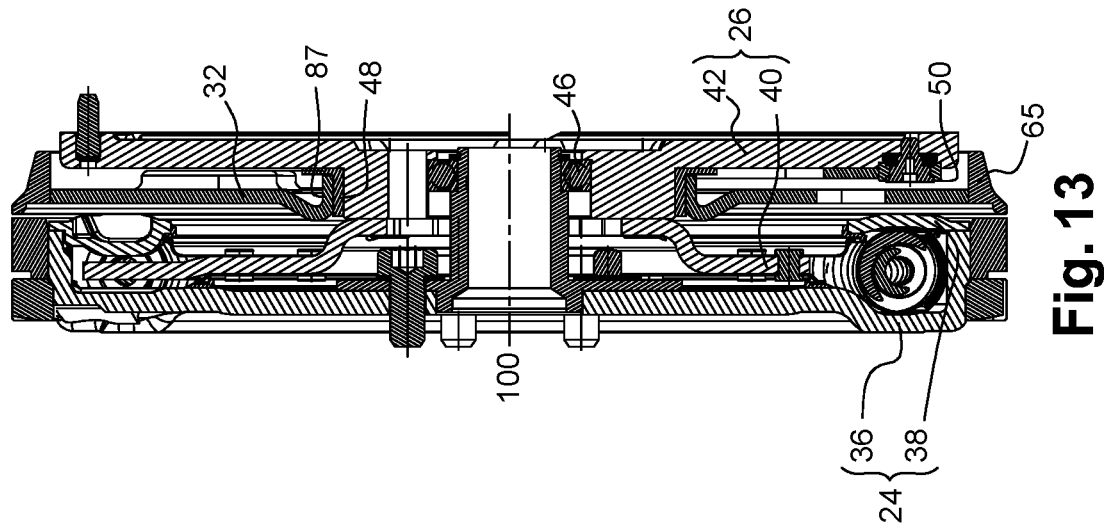
Fig. 13
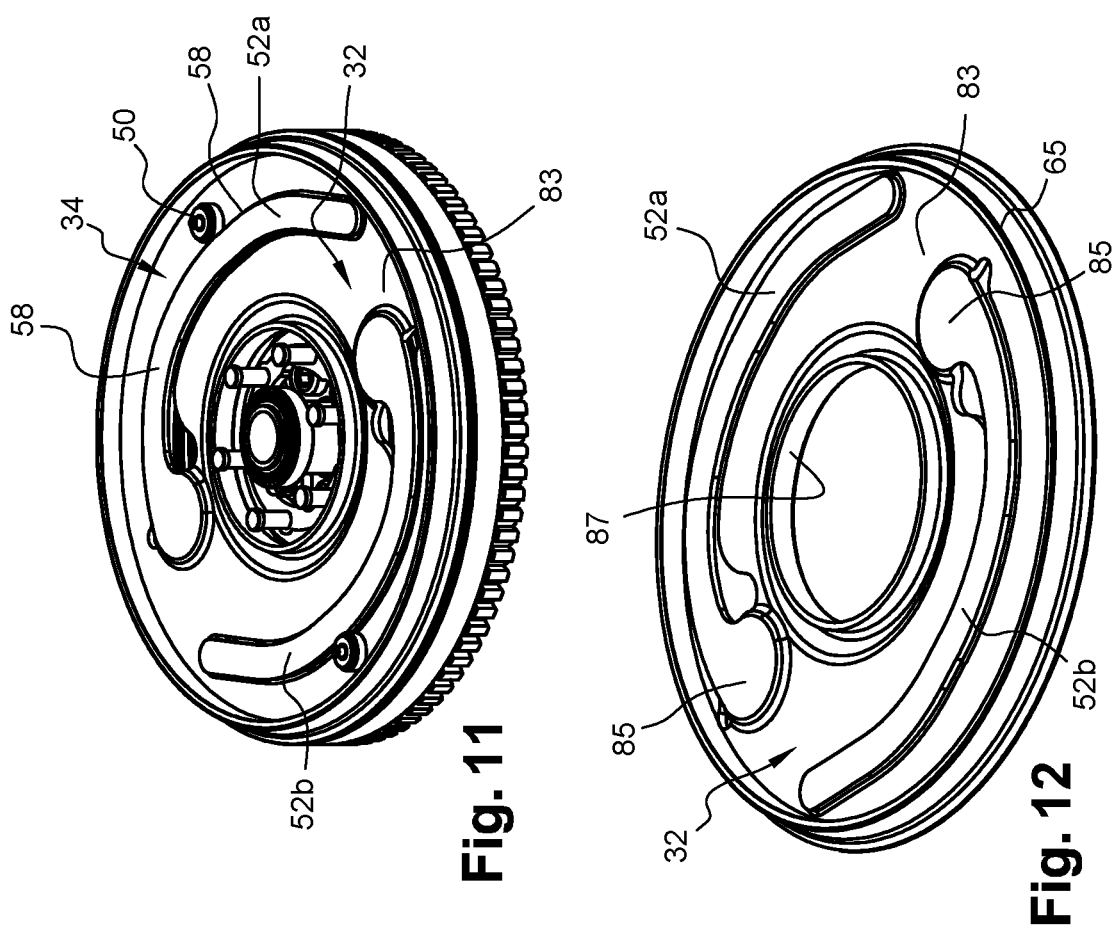
Fig. 11
Fig. 12

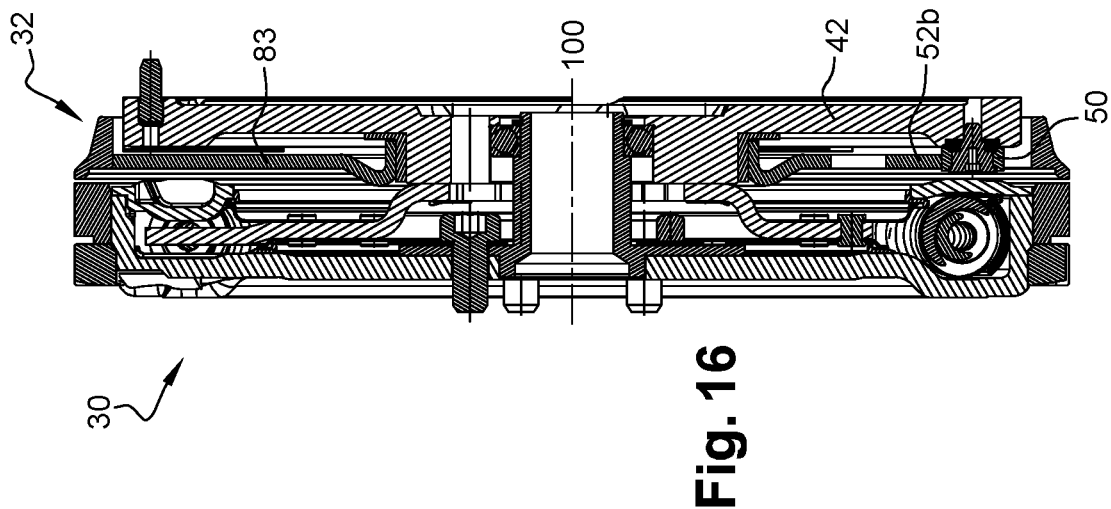
Fig. 16
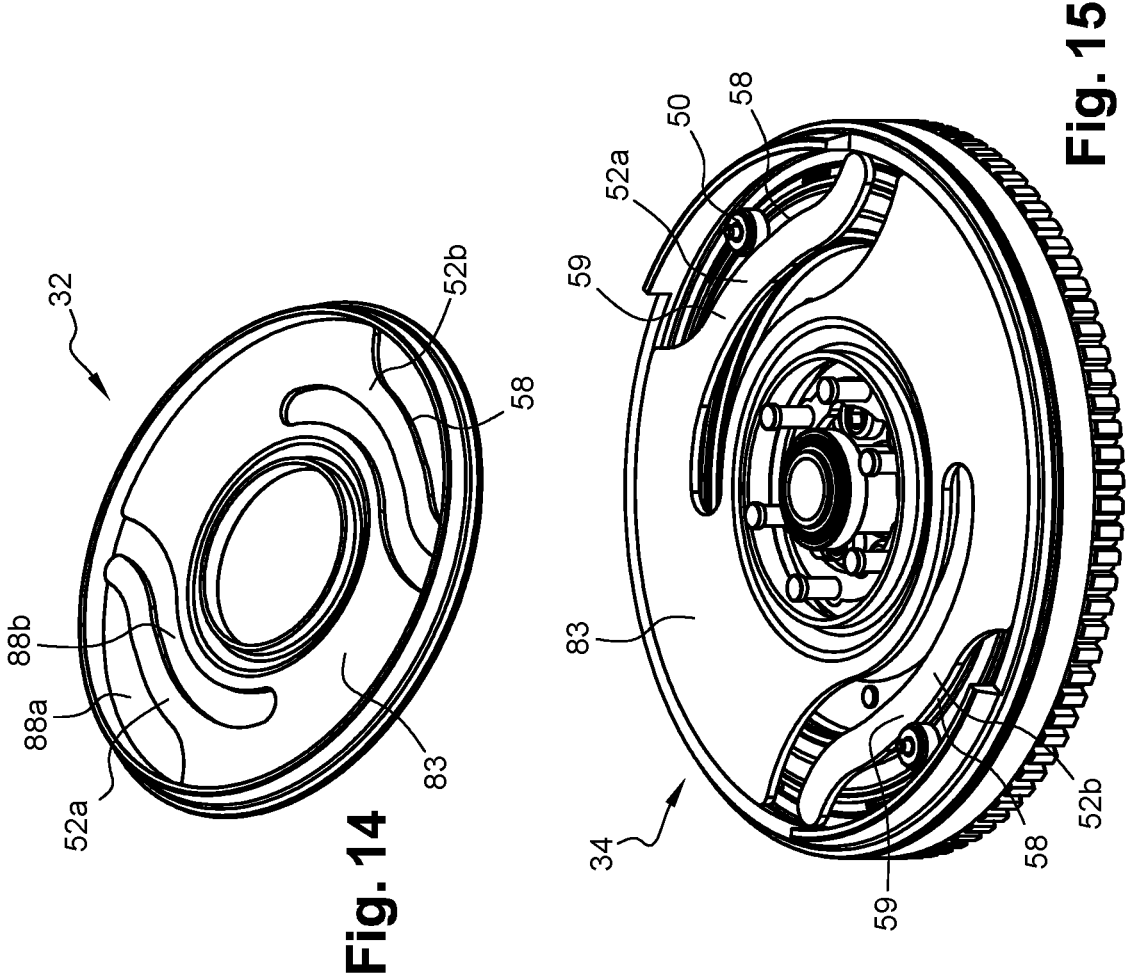
Fig. 14
Fig. 15

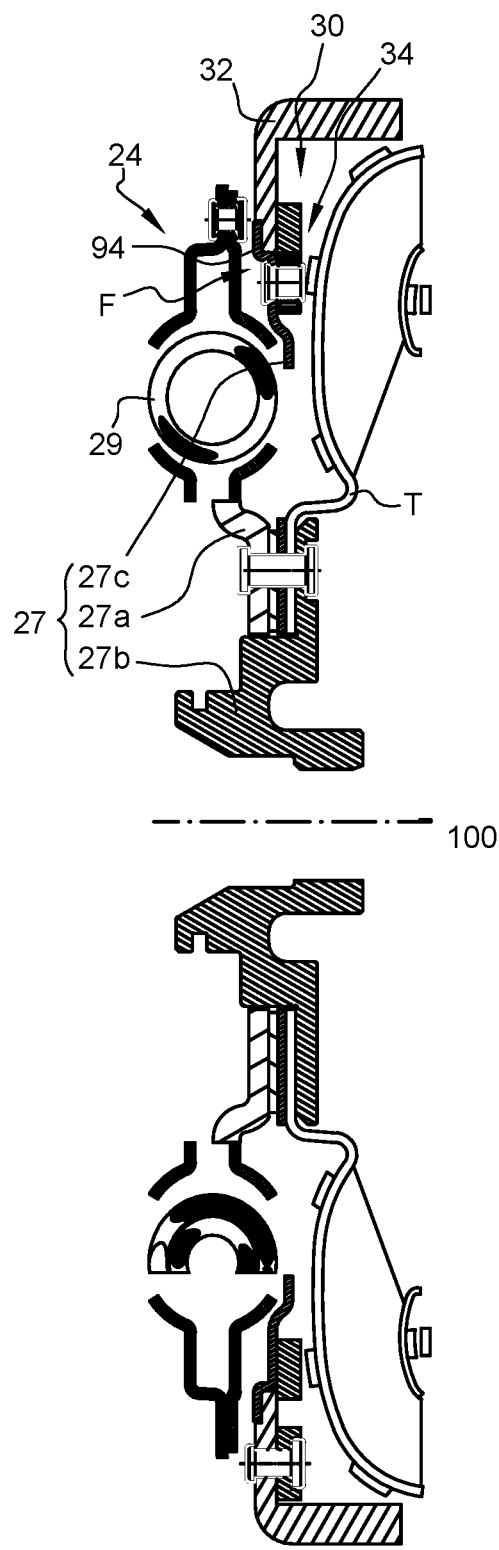
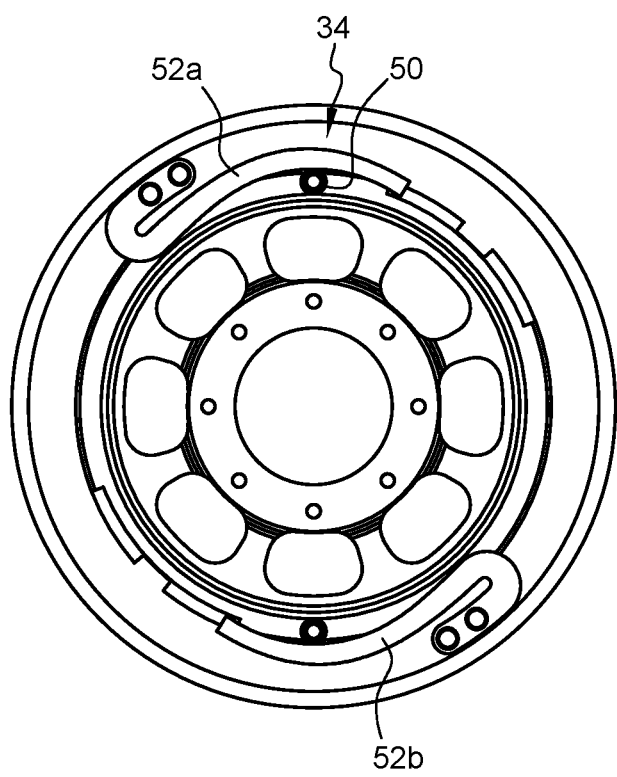
Fig. 20
Fig. 21

VIBRATION DAMPER, ASSOCIATED DAMPING MECHANISM AND PROPULSION ASSEMBLY

TECHNICAL FIELD OF THE INVENTION

The invention relates to the filtration of acyclic irregularities of an internal combustion engine, especially for application to a motor vehicle and in particular to a vibration damper of the inertial beater type, more particularly designed to be interposed between an internal combustion engine and a gearbox and, for example, being capable of being integrated in a torque converter or a dry or friction or wet clutch mechanism. It also relates to a propulsion assembly and a damping mechanism incorporating such a vibration damper.

Within the scope of the present application, vibration damper of the beater type denotes a filtration mechanism arranged to be connected to a transmission train solely by way of the member to be damped or to be driven rotationally solely by way of the member to be damped. In practice, such a damper may be provided with one or more "crazy" oscillating masses connected to a member to be damped by one or more resilient elements of constant or variable stiffness, wherein the oscillating mass or masses is or are not intended to be connected to elements other than the member to be damped.

BACKGROUND ART

In order to attenuate the rotational irregularities of an internal combustion engine crankshaft, mainly at speeds between idling speed and an intermediate operating speed, for example approximately 2500 rpm, it has been proposed in document FR2857073 to couple, directly to the crankshaft of an internal combustion engine, an inertial flywheel for attenuating torsional vibrations or fluctuations of speed of revolution, constituted of a first inertial mass joined to rotate with the crankshaft and provided with a starter ring gear and a reaction platen of a friction clutch, and of a second inertial mass rotationally movable relative to the first, by virtue of four articulated connecting modules, each provided with at least one oscillating arm pivoting relative to the first inertial mass around an axis parallel to the axis of revolution, an oscillating mass positioned at one free end of the oscillating arm in such a way as to be movable in substantially radial direction, and a connecting rod that connects an intermediate point of the oscillating arm to the second inertial mass. By centrifuge effect, the articulated modules are opposed to relative rotation of the inertial masses by exerting a restoring torque substantially proportional to the relative rotation of the two inertial masses and to the square of the speed of revolution of the inertial mass connected to the crankshaft.

The laws of physics of this inertial flywheel make it possible to achieve particularly optimized filtering for an operating speed of revolution, and its effect remains beneficial although not optimal over a range of values of speed of revolution around the optimized speed. However, the structure of the mechanism is complex, with several modules that each necessitate three pivots subjected to centrifugal forces and several moving pieces. It is necessary to provide blocking of the connecting modules when the speed of revolution exceeds the intermediate operating speed, to prevent the pivots from being loaded beyond their mechanical strength limits. This blocking is achieved by blocks of elastomeric material interposed between the oscillating masses and the second inertial mass, and coming into contact with the second inertial mass when the speed of revolution exceeds the intermediate operating speed. These elastomer blocks add to the expense of the mechanism, and they may age prematurely. Furthermore, the mechanism is noisy during the transitional idling phases, when the speed of revolution is no longer sufficient.

DISCLOSURE OF THE INVENTION

The invention is aimed at remedying the disadvantages of the prior art and at proposing a simplification of the means for filtering the acyclic irregularities of an internal combustion engine over a range of values of speed of revolution around the optimized speed.

According to a first aspect of the invention, it is proposed that this be accomplished by a vibration damper of the beater type, provided with:
two rotating members guided rotationally around an axis of revolution, wherein one of the two rotating members is an inertial flywheel oscillating around the axis of revolution and the other of the two rotating members is a member to be damped, wherein the member to be damped is arranged to be driven by a torque following a torque path between a driving member and a driven member, wherein the inertial flywheel is arranged to be connected kinematically to the torque path between the driving member and the driven member solely by way of the member to be damped; and
one or more connecting modules between the two rotating members, permitting a relative angular displacement $\theta$ between the two members rotating around the axis of revolution on the two sides of a reference relative angular position.

According to the invention, each connecting module is provided with:
a roller associated with a first of the two rotating members and
a cam track connected resiliently by a resilient element to a second of the two rotating members, wherein the resilient element is capable of being deformed to ensure resilient bracing of the cam track against the roller, thus permitting the roller to roll over the cam track when the two rotating members are rotating relative to one another on the two sides of the reference position.

The use of a cam track makes it possible to vary the damping capabilities of the vibration damper by modifying the profile of this track. The choice of a rolling connection between a roller and a cam track also makes it possible to minimize friction effects. By construction, the resilient element maintains contact between the roller and the cam track at all operating speeds and therefore also when stopped, which eliminates the noises experienced with the prior art mechanisms.

Preferably, the resilient element is arranged such that the stiffness of the resilient element increases when the speed of rotation of the vibration damper increases. This makes it possible to broaden the frequency range in which the vibration damper is effective.

According to a particularly advantageous embodiment, the vibration damper is provided with a resilient strip constituting the resilient element and containing:
a fixation portion fixed on the second of the two rotating members, and
a flexible portion capable of flexing to ensure resilient bracing of the cam track against the roller, thus permitting the roller to roll over the cam track when the two rotating members are rotating relative to one another on the two sides of the reference position.

Thus the structure of the connecting modules is particularly simple and it minimizes the number of moving pieces. The axial space used by the strip is small. Advantageously, the cam track is arranged on the flexible portion. Preferably, the flexible portion is provided with an intermediate deformation portion connecting the fixation portion to the cam track. The intermediate deformation portion makes it possible to absorb the flexion constraints of the strip.

According to one embodiment, the intermediate deformation portion is U-shaped in a plane perpendicular to the axis of revolution. This configuration makes it possible to utilize part of the volume available around the axis of revolution, in such a way as to maximize the amplitude of radial displacement of the connecting module or modules.

According to another embodiment, the flexible portion is circumferentially curved around the axis of rotation extending up to a free end arranged to be displaced with a radial component when the two rotating members are rotating relative to one another. This configuration makes it possible to realize a flexible portion of large dimension, permitting large displacements, and making it possible to combine an effect of resilient restoration of the rotating members toward the reference position and an effect of inertia, because the free end of the resilient strip, while rotating around the axis of revolution, tends to become offset radially toward the exterior under the effect of centrifugal force.

According to a preferred embodiment, the cam track is turned radially toward the exterior and toward the roller. The resilient strip combines an effect of resilient restoration of the rotating members toward the reference position and an effect of inertia, because the resilient strip, while rotating around the axis of revolution, becomes deformed under the effect of centrifugal force. Because the resilient strip is retained by the roller arranged radially on the exterior of the strip, the rotation generates, in the region of the connecting modules, a restoring torque substantially proportional to the square of the speed of revolution and to the angular displacement between the two rotating members.

The resilient strip is preferably arranged such that, at zero speed, the angular opening separating the reference relative angular position from the free end is larger than 30°, preferably than 45°, for example larger than 60°. With such positioning of the free end of the strip relatively distant from the reference relative angular position, the effect of centrifugal force on the stiffness variations of the connecting modules is amplified.

More generally, and according to a particularly advantageous embodiment, the resilient element is arranged in such a way as to permit displacement of the cam track having a radial component when the two rotating members are rotating relative to one another. By imposing a radial displacement of the cam track, the inertial torque of the connecting module is modified relative to the axis of revolution, as is therefore the response of the vibration damper as a function of the speed of revolution, by combining a resilient restoring effect and an inertial effect.

According to a preferred embodiment, the roller is a roller pivoting around an axis of rotation fixed relative to the first rotating member.

It may be provided that a stop limits the angular displacement between the two rotating members.

Preferably, the connecting module or modules are provided with at least two connecting modules, preferably identical and preferably disposed symmetrically relative to the axis of revolution. The symmetry permits balancing of the rotating masses. It is possible to provide a number of connecting modules greater than two, for example three connecting modules disposed at 120° or four connecting modules disposed at 90°.

Preferably, in the reference relative position, the roller is braced against a zone of the cam track orthoradial relative to the reference axis. In the reference position, the restoring torque is therefore zero, because the forces transmitted between the cam track and the roller are purely radial. The reference position is a stable equilibrium position of the mechanism, and is so for all speeds of rotation.

Preferably, the oscillating inertial flywheel is guided rotationally around a hub formed on the member to be damped, in particular by way of a bearing, for example a sliding bearing.

The vibration damper is intended to be connected to a transmission train, especially of a motor vehicle, and the vibration damper is arranged to be connected to this transmission train solely by way of the element to be damped. In other words, the oscillating inertial flywheel is intended to oscillate freely solely under the effect of its mass and of the guidance realized by the connecting module or modules, and to do so in all states of the transmission train.

Preferably, the member to be damped is arranged to be driven by an engine torque and to transmit the engine torque of a driving member to a driven member, wherein the oscillating inertial flywheel is arranged to be disposed in branched manner relative to the path followed by the engine torque between the driving member and the driven member.

In practice, the member to be damped is provided with means for mechanical connection to the driving member and/or to the driven member, wherein the oscillating flywheel is deprived of means for mechanical connection to the driving member and of means for mechanical connection to the driven member. The mechanical connection may be constituted by means for fixation rotationally and translationally (for example, holes through which fixation rods are passed) or rotationally only (for example, a grooved cavity) and/or by resilient means, especially by springs connecting the member to be damped to the driving member and/or to the driven member. Preferably, the vibration damper is deprived of frictional damping means that dissipate energy when the two rotating members are rotating relative to one another on the two sides of the reference position. In fact, the vibration damper is not intended to have an energy-dissipating damping function.

According to one embodiment, the connecting module or modules are such that, when the member to be damped is rotating at a speed of revolution ω, the connecting module or modules generate together, between the two rotating members, a resultant torque $\Gamma_R$ of restoration toward the reference position, which is a function of the angular displacement θ between the two rotating members and of the speed of revolution ω, and such that:

$$\frac{3}{4}C \le \left| \frac{\Gamma_R}{\theta \cdot \omega^2} \right| \le \frac{5}{4}C$$

where C is a positive constant, given when the speed of revolution ω varies in a speed range between a predetermined minimal value ωmin below 1000 rpm and a predetermined maximal value ωmax higher than 1500 rpm.

By combining a resilient restoring effect and an inertial restoring effect in this way, in judiciously chosen proportions, a restoring torque is obtained that is substantially proportional to the square of the speed of revolution and to the angular displacement between the two rotating members, which is equivalent to saying that the connecting module or modules generate, between the two rotating members, an apparent stiffness substantially proportional to the square of the speed of revolution. It is possible in fact to define an apparent stiffness K of the vibration damper equal to the quotient of the resultant torque $\Gamma_R$ over the corresponding angular displacement $\theta$, wherein this stiffness K is such that:

$$ \tfrac{3}{4} C \omega^2 \le K \le 5/4 C \omega^2 $$

Preferably, the connecting module or modules are shaped in such a way that the resultant torque $\Gamma_R$ of restoration toward the reference position is such that, for at least one predetermined speed of revolution $\omega_0$ lower than 1000 rpm and at least one whole number N equal to 1, 2, 3, 4 or 6, the following relationship, where I denotes the moment of inertia of the inertial flywheel oscillating around the axis of revolution, is satisfied:

$$ \frac{9}{10} \frac{\omega_0}{2} N \le \frac{1}{2\pi} \sqrt{\left| \frac{\Gamma_R}{\theta \cdot \omega^2 \cdot I} \right|} \le \frac{11 \omega_0}{10 \; 2} N $$

Preferably:

$$ \frac{1}{2\pi} \sqrt{\left| \frac{\Gamma_R}{\theta \cdot \omega^2 \cdot I} \right|} = \frac{\omega_0}{2} N $$

It is known that the main frequency of acyclic irregularity of an engine depends on the type of engine and especially on the number of cylinders. Thus, for a four-stroke engine and thus one ignition per cylinder every two crankshaft revolutions, the main acyclic irregularity frequency $F_M$ generally corresponds to the frequency of ignition of the cylinders, i.e., for an N-cylinder engine and for a given speed of revolution $\omega$ of the crankshaft, to:

$$ F_M = \frac{\omega}{2} N $$

By matching the resonance frequency of oscillation of the vibration damper to the main acyclic irregularity frequency $F_M(\omega)$ of the engine, it is possible, for a range of speeds of revolution, for the vibration damper to beat in phase opposition relative to the acyclic irregularities, leading to a large attenuation of the vibratory level. The rotating member connected to the crankshaft is therefore subjected to antagonistic torques in phase opposition that compensate one another at least partly, i.e. on the one hand an input acyclic torque originating from the crankshaft, and on the other hand an oscillating torque transmitted by the connecting modules.

To obtain the desired matching between the resonance frequency of oscillation of the vibration damper and the main acyclic irregularity frequency, the possibility that the rolling connection module according to the invention offers is advantageously used to vary, by means of the profile of the cam tracks, the law relating the angular displacement between the two rotating members and the transmitted torque.

According to another aspect of the invention, it relates to a damping mechanism provided with an input member and an output member connected by a kinematic torque-transmission train and a vibration damper such as described in the foregoing, wherein the member to be damped is constituted by the input member, the output member or an element of the kinematic transmission train between the input member and the output member, wherein the oscillating flywheel is disposed in branched manner relative to the kinematic torque-transmission train. In particular, this aspect of the invention relates to a damping mechanism provided with an input member and an output member connected by a kinematic torque-transmission train and a vibration damper such as described in the foregoing, wherein the member to be damped is constituted by the input member, the output member or an element of the kinematic transmission train between the input member and the output member, wherein the oscillating flywheel is disposed in branched manner relative to the kinematic torque-transmission train.

Preferably, the oscillating inertial flywheel is guided rotationally around a hub formed on the member to be damped by way of a bearing overlapping axially relative to the bearing that ensures rotational guidance for the secondary flywheel relative to the primary flywheel. Thus the architecture of the damping mechanism is optimized such that the axial space requirement of the damping mechanism is reduced. To achieve this, the secondary inertial flywheel is advantageously provided with a hub, the inside diameter of which is mounted around the bearing that ensures rotational guidance for the secondary flywheel relative to the primary flywheel, and the outside diameter of which supports the bearing of the oscillating inertial flywheel.

According to another aspect of the invention, it relates to a propulsion assembly provided with a driving member rotating around an axis of revolution, a driven member connected to the driving member by a torque path, and a vibration damper such as described in the foregoing, wherein the member to be damped is on the torque path and the oscillating flywheel is branched off from of the torque path.

In particular, it relates to a propulsion assembly provided with an internal combustion engine provided with a crankshaft rotating around an axis of revolution, and a vibration damper such as described in the foregoing, wherein the member to be damped is driven by the crankshaft.

Particularly advantageously, the internal combustion engine is a four-stroke N-cylinder engine, wherein the connecting module or modules are shaped in such a way that they generate together, between the two rotating members, a resultant torque $\Gamma_R$ of restoration toward the reference position, which is a function of the angular displacement $\theta$ between the two rotating members and of the speed of revolution $\omega$, and such that, for at least one predetermined speed of revolution $\omega_0$ lower than 1000 rpm and at least one whole number N equal to 1, 2, 3, 4, 5, 6, 7 or 8, the following relationship is satisfied:

$$ \frac{9}{10} \frac{\omega_0}{2} N \le \frac{1}{2\pi} \sqrt{\left| \frac{\Gamma_R}{\theta \cdot \omega^2 \cdot I} \right|} \le \frac{11 \omega_0}{10 \; 2} N $$

The mechanism defined in this way is therefore particularly adapted to filtration of the frequency $\omega_0/2N$, which typically corresponds to the acyclic irregularity frequency of a four-stroke N-cylinder engine rotating and the speed $\omega_0$. Preferably:

$$\frac{1}{2\pi}\sqrt{\left|\frac{\Gamma_R}{\theta \cdot \omega^2 \cdot I}\right|} = \frac{\omega_0}{2}N$$

Preferably, the propulsion assembly is additionally provided with a gearbox and the member to be damped is disposed in series between the crankshaft and the gearbox, wherein the oscillating inertial flywheel is kinematically connected only to the member to be damped.

According to a particularly advantageous embodiment, the member to be damped is a secondary flywheel of a double damping flywheel or of a long-stroke damper, or a phasing disk of a long-stroke damper.

According to one embodiment, the inertial flywheel is provided with an annular sheet-metal plate and an inertial ring gear fixed radially on the exterior of this annular sheet-metal plate.

According to one embodiment, the resilient strips and the annular sheet-metal plate of the inertial flywheel are formed in a single piece.

According to one embodiment, each strip is formed by means of a cut made in the annular sheet-metal plate. Each cut makes it possible to obtain the exterior contour of each flexible portion, wherein each strip is connected to the annular sheet-metal plate by way of a base.

According to one embodiment, each base is stamped in such a way that each strip is offset axially relative to the annular sheet-metal plate of the inertial flywheel.

According to another embodiment, the strips are capable of flexing in the same plane as the plane in which the annular sheet-metal plate is disposed. An indentation arranged radially on the exterior of the flexible portion of each strip permits the displacement of a roller on the cam track of each strip. Similarly, an indentation arranged radially on the interior of the flexible portion of each strip permits a radial displacement of the strip in the direction of the axis when the cam roller is displaced on the cam track.

The invention also relates to a torque converter provided with a vibration damper such as described in the foregoing.

The invention also relates to a torque converter comprising a vibration damper of the inertial beater type, wherein the vibration damper is provided with:

two rotating members guided rotationally around an axis of revolution, wherein one of the two rotating members is an inertial flywheel oscillating around the axis of revolution and the other of the two rotating members is a member to be damped, wherein the member to be damped is arranged to be driven by a torque following a torque path between a driving member and a driven member, wherein the inertial flywheel is arranged to be connected kinematically to the torque path between the driving member and the driven member solely by way of the member to be damped; and one or more connecting modules between the two rotating members, permitting a relative angular displacement θ between the two members rotating around the axis of revolution on the two sides of a reference relative angular position, each connecting module is provided with:

a cam follower associated with a first of the two rotating members and a cam track connected resiliently by a resilient element to a second of the two rotating members, wherein the resilient element is capable of being deformed to ensure resilient bracing of the cam track against the cam follower, thus permitting the cam follower to be displaced over the cam track when the two rotating members are rotating relative to one another on the two sides of the reference position.

According to one embodiment, the torque converter is provided with springs arranged between an input member and an output member, wherein the member to be damped is the input member.

According to another embodiment, the torque converter is provided with springs arranged between an input member and an output member, wherein the member to be damped is the output member.

According to one embodiment, the cam follower is a roller mounted to move rotationally while rolling on the cam track. In one variant, the cam follower is a roller arranged between the cam track and the first rotating member in order to roll both on the cam track and the first rotating member when the two rotating members are rotating relative to one another.

According to one embodiment, the cam follower is formed by a boss, formed on the first rotating member, arranged to be displaced on the cam track.

According to one embodiment, the member to be damped is provided with a support plate of sheet metal on which the rollers are mounted, wherein the strips are mounted on the inertial flywheel.

According to another embodiment, the member to be damped is provided with a support plate of sheet metal on which the strips are mounted, wherein the rollers are mounted on the inertial flywheel.

According to one embodiment, the vibration damper is provided with a circular centering zone around the axis of rotation in order to ensure centering of the inertial flywheel on the sheet-metal support plate.

According to one embodiment, the radially external rim of the sheet-metal support plate is bent over to form a surface for cooperation with the inertial flywheel.

According to one embodiment, the radially external rim of the sheet-metal support plate forms a baffle forming on the one hand a cylindrical friction surface and on the other hand an axial retaining element.

In practice, the propulsion assembly may be provided additionally with a gearbox. The oscillating member is then advantageously disposed in branched manner relative to the transmission train connecting the crankshaft and the gearbox. In other words, the rotating member constituting the member to be damped is arranged to be driven by an engine torque and to transmit an engine torque from a driving member to a driven member. The other of the rotating members, which constitutes the oscillating inertial flywheel, is arranged in branched manner relative to the path followed by the engine torque.

BRIEF DESCRIPTION OF THE FIGURES

Other characteristics and advantages of the invention will become apparent upon reading the description hereinafter with reference to the attached figures, wherein:

FIGS. 11 to 13 present another embodiment.

FIGS. 14 to 16 present another embodiment.

FIGS. 20 and 21 present another embodiment.

For greater clarity, the identical or similar elements are marked by identical reference symbols on all figures.

DETAILED DESCRIPTION OF EMBODIMENTS

Figure 1:
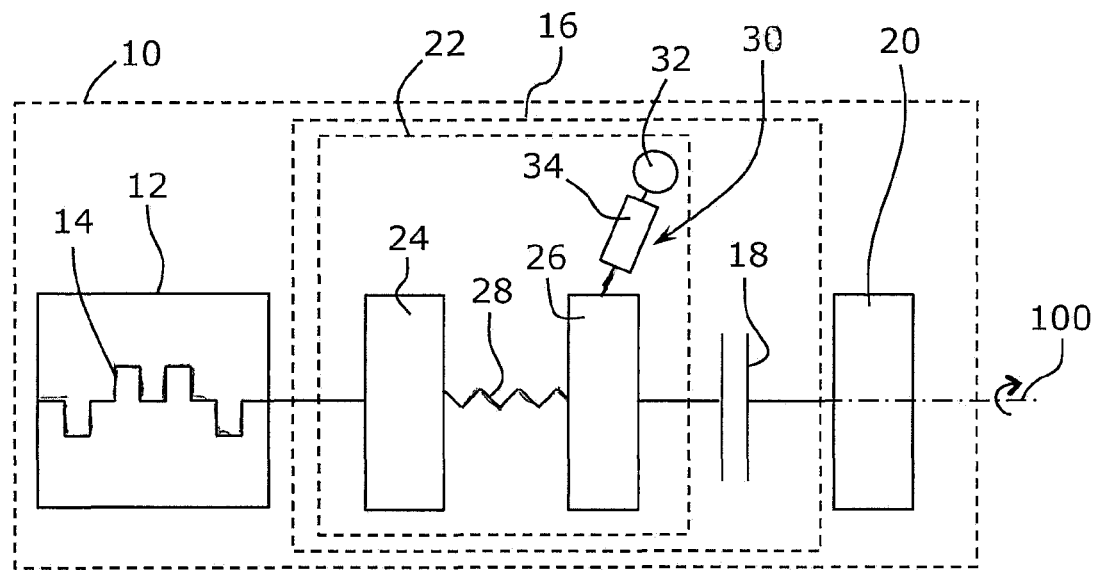
FIG. 1 illustrates a schematic view of a propulsion assembly according to one embodiment of the invention, provided with a double inertial flywheel in which a vibration damper is integrated.

FIG. 1 illustrates a motor-vehicle propulsion assembly 10 provided with an internal combustion engine 12, crankshaft 14 of which drives a kinematic transmission train 16 provided with a dry clutch 18 situated upstream from a gearbox input shaft 20. A damping mechanism 22 constituting a double damping flywheel 22 and provided with an input member constituted by a primary flywheel 24 integral with crankshaft 14 and an output member constituted by a secondary flywheel 26 integral with a clutch reaction platen 18 or comprising only one piece therewith is disposed kinematically between crankshaft 14 and friction clutch 18 in kinematic transmission train 16. Resilient members 28 are interposed between the input member and the output member in such a way as to work during angular positioning fluctuations between primary flywheel 24 and secondary flywheel 26. A vibration damper 30 according to the invention, provided with an oscillating inertial flywheel 32 disposed in branched manner relative to the kinematic train connecting crankshaft 14 to the gearbox, and connecting modules 34 connecting oscillating inertial flywheel 32 to secondary flywheel 26, permits attenuation of vibrations of secondary flywheel 26 at low speed. Crankshaft 14, damping mechanism 22, clutch 18 and input shaft 20 of the gearbox rotate around one and the same axis of revolution 100.

Figure 2:
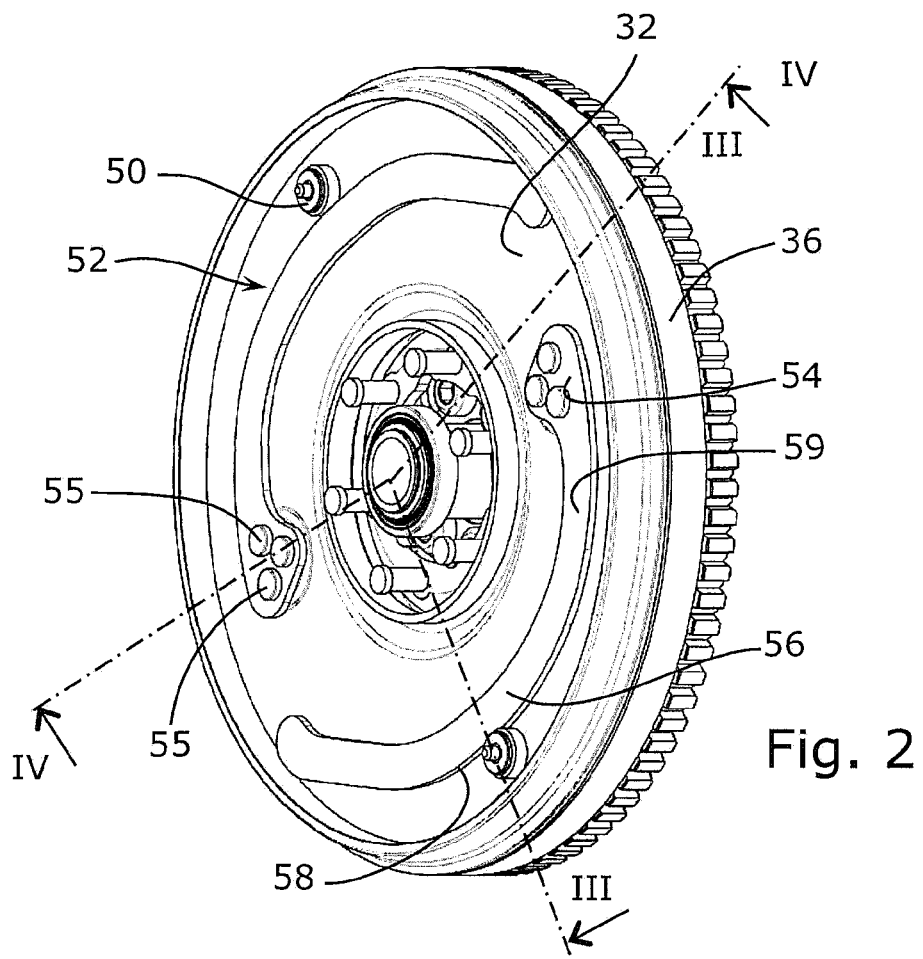
FIG. 2 illustrates a view in perspective of part of the double inertial flywheel of the propulsion assembly of FIG. 1.
Figure 3:
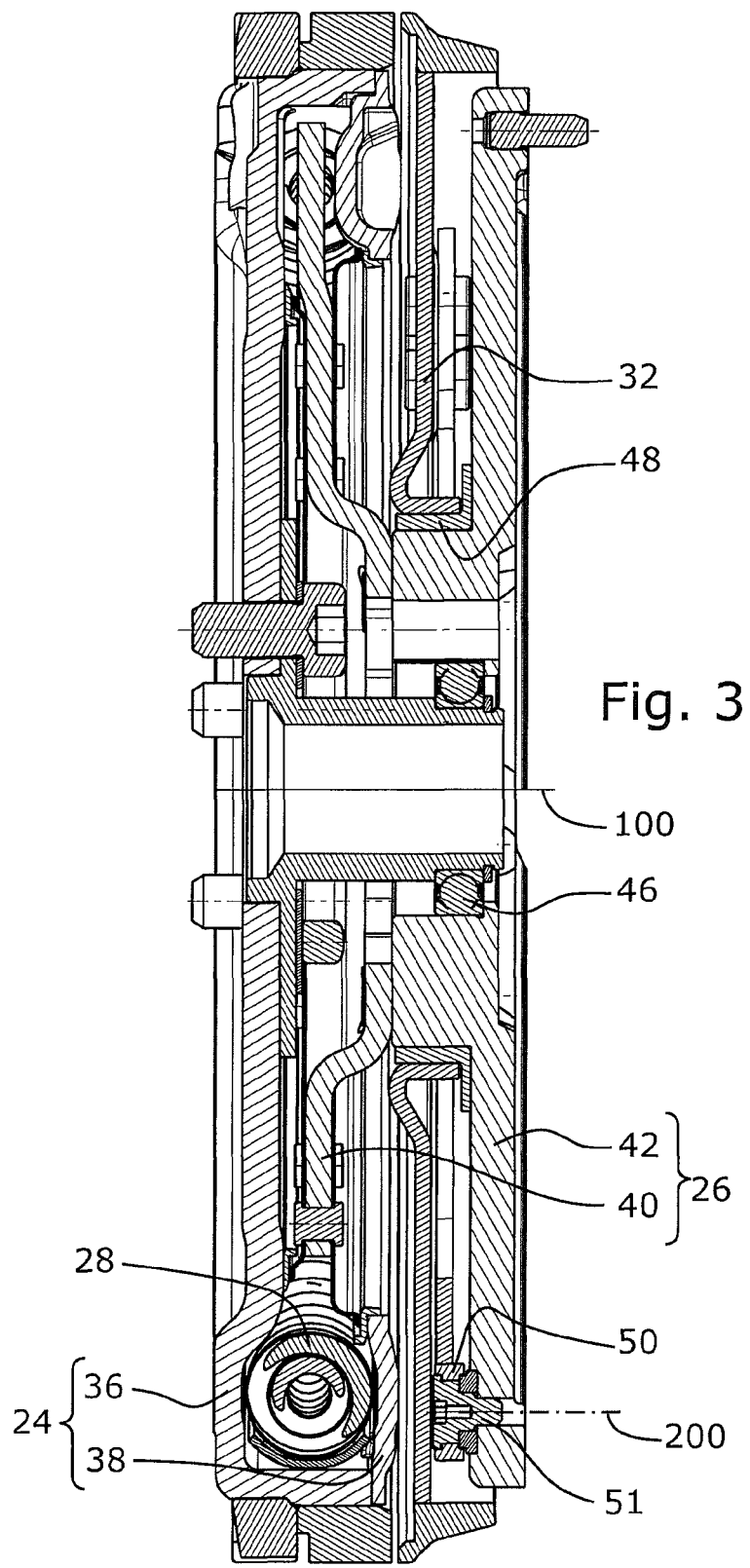
FIG. 3 illustrates a view in section of the double inertial flywheel of FIG. 2.
Figure 4:
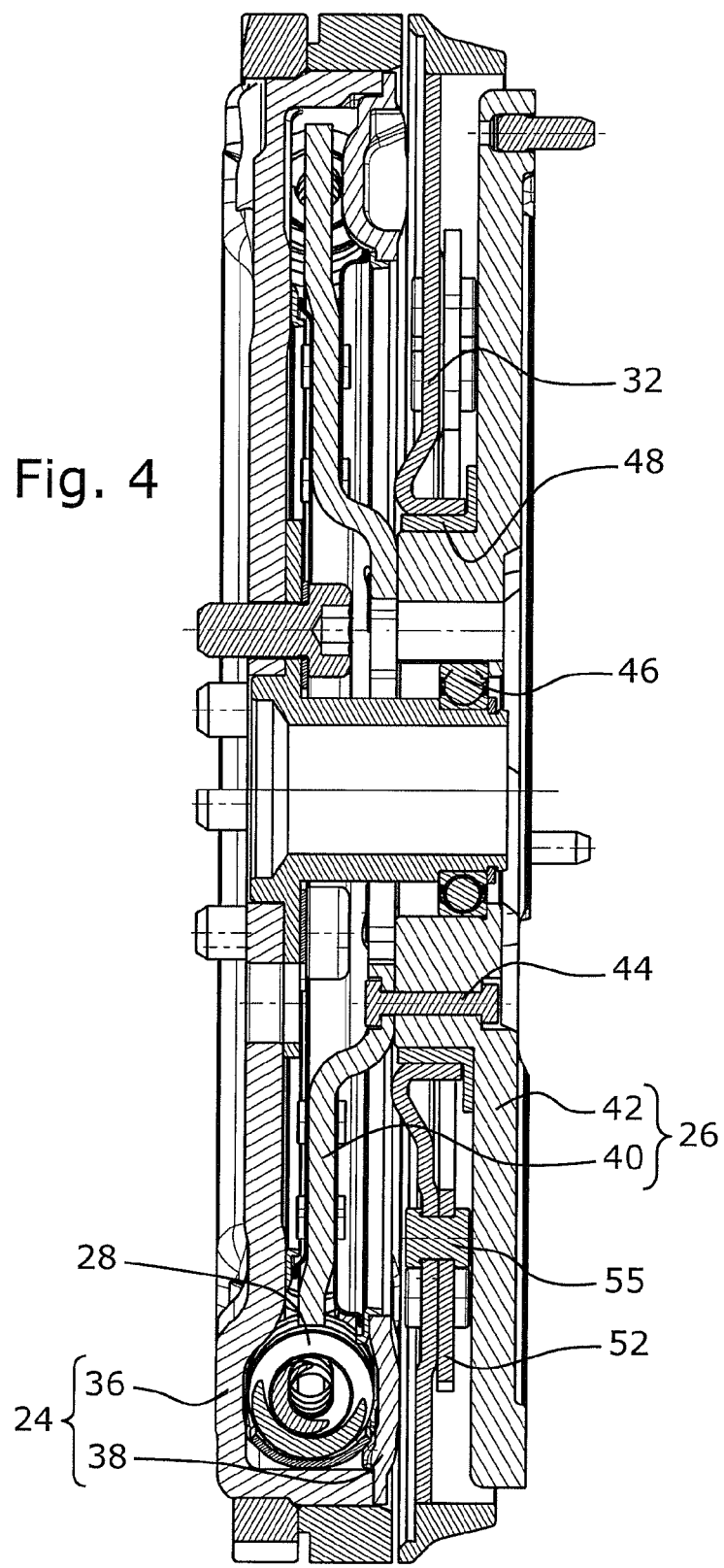
FIG. 4 illustrates a front view of part of the double inertial flywheel of FIG. 2.

The structure of double damping flywheel 22 and of vibration damper 30 is illustrated in detail in FIGS. 2 to 4. Primary flywheel 24 is composed of a platen 36 and of a cover 38 fixed to one another, between which coil springs constituting resilient members 28 and a shroud 40 of secondary flywheel 26 are disposed. Secondary flywheel 26 is additionally provided with a massive platen 42 fixed to shroud 40 by rivets 44, thus also forming the reaction platen of friction clutch 18. A roller bearing 46 ensures rotational guidance of secondary flywheel 26 relative to primary flywheel 24.

Oscillating inertial flywheel 32, guided rotationally relative to secondary flywheel 26 by a sliding bearing 48, is disposed between cover 38 and platen 42.

Secondary inertial flywheel 26 is provided with a hub, in the interior of which roller bearing 46 is fitted and on the exterior of which sliding bearing 48 is fitted.

Advantageously, oscillating inertial flywheel 32 is provided with a sheet-metal disk stamped in such a way as to form on its central part a cylindrical part parallel to the axis of revolution and supported by bearing 48. An annular mass may be fixed on the outside diameter of this disk to increase the inertia.

Connecting modules 34 connecting oscillating inertial flywheel 32 to secondary flywheel 26 are two in number and each comprises a roller 50 mounted to move rotationally around a rod 51 in order to rotate, relative to secondary flywheel 26, around an axis of rotation 200 parallel to axis of revolution 100 and situated at a distance from this latter, and a resilient strip 52 provided with an end portion 54 fixed to oscillating inertial flywheel 32 by rivets 55. Rolling bearings of ball or needle type may be placed between rod 51 and roller 50 to favor rolling. The resilient strip is additionally provided with a flexible portion comprising a guide portion or cam 56, which forms a cam track 58 situated radially in the interior of roller 50, i.e. between roller 50 and axis of revolution 100, and braced on roller 50, and an intermediate resilient deformation portion 59. Stops (not visible in the figures) limit the possible angular displacement between oscillating inertial flywheel 32 and secondary flywheel 26 on the two sides of a reference relative position, in which roller 50 is in contact with a zone of cam track 58, referred to as reference zone or equilibrium zone, which is orthoradial relative to axis of revolution 100, i.e. is tangential, in a plane perpendicular to axis of revolution 100 and to axis of rotation 200, to a perpendicular to a radial axis passing through axis of revolution 100 and axis of rotation 200. The reference position therefore corresponds to a zero torque transmitted between secondary flywheel 26 and the oscillating inertial flywheel, and is so independently of the speed of rotation, since the contact forces transmitted between roller 50 and cam track 58 in the reference position are purely radial.

The curvature of cam track 58 on the two sides of the reference position is such that the normal to the point of contact of cam track 58 with roller 50 has an orthoradial component oriented toward the reference position, which increases when the angular displacement θ relative to the reference position increases. While rolling over cam track 58 on the two sides of the reference position, roller 50 causes resilient strip 52 to flex in the region of intermediate deformation portion 59. In this way it is ensured that the contact between roller 50 and cam track 58 generates, on oscillating inertial flywheel 32 and on secondary flywheel 26 respectively, two opposed torques, around axis of revolution 100, that tend to restore oscillating inertial flywheel 32 and secondary flywheel 26 toward the reference position.

The torque of restoration toward the reference position, transmitted by the interaction between roller 50 and cam track 58 to secondary flywheel 26, which here constitutes the member to be damped, will be considered in the following. Resilient strip 52 has a flexural stiffness such that, even when stopped, the restoring force has a resilient component $\Gamma_1$ of restoration toward the reference relative position, which is a function of the angular displacement θ between the two rotating members 26, 32. To a first approximation, disregarding the deformations of resilient strip 52 as a function of the speed of revolution, it may be considered that this resilient component $\Gamma_1$ is relatively independent of the speed of revolution and, as the case may be, may be estimated when stopped.

Furthermore, resilient strip 52 has an inertia which, when resilient strip 52 is rotating at a speed of revolution ω, generates a centrifugal force on roller 50, such that the restoring force has an inertial component $\Gamma_2$ of restoration toward the reference relative position, which is a function of the angular displacement θ between the two rotating members 26, 32 and of the speed of revolution ω.

The two components $\Gamma_1$ et $\Gamma_2$, which have been described separately here and for each connecting module 34 are added to generate, globally, a resultant torque $\Gamma_R$, which is exerted on secondary flywheel 26 and which may be measured on a test bench by making secondary flywheel 26 and oscillating inertial flywheel 32 rotate at a given speed of revolution ω and then measuring the torque necessary to maintain a given angular displacement θ.

To make the behavior of vibration damper 30 approach that of a pendulum with a good degree of approximation, the stiffness of resilient strip 52 and the slope of cam track 58 are chosen in such a way that the resultant torque $\Gamma_R$ is, with a good degree of approximation, proportional to the angular displacement θ at given speed of revolution ω in a speed range lying between a predetermined minimal value $\omega_{min}$ lower than 1000 rpm and a predetermined maximal value $\omega_{max}$ higher than 1500 rpm, and proportional to the square of the speed of revolution to for a given angular displacement θ in the range of possible angular displacements. In this particular case, a positive constant C is defined, such that the following relationship is satisfied in the speed range between $\omega_{min}$ and $\omega_{max}$:

$$\frac{3}{4}C \leq \left|\frac{\Gamma_R}{\theta \cdot \omega^2}\right| \leq \frac{5}{4}C$$

It is then possible to define an apparent stiffness K of the vibration damper 30 equal to the quotient of the resultant torque $\Gamma_R$ over the corresponding angular displacement θ, wherein this stiffness K is substantially proportional to the square of the speed of revolution ω and such that:

$$¾Cω² ≤ K ≤ 5/4Cω²$$

For every given speed of revolution ω in the speed range between the range of speeds between $\omega_{min}$ and $\omega_{max}$, vibration damper 30 behaves as a pendulum with a resonance oscillation frequency $F_V$, which is a function of the apparent stiffness K and of the inertia I of oscillating inertial flywheel 32. To a first degree of approximation, this stiffness K is related to the resonance oscillation frequency $F_V$ and to the moment of inertia of oscillating inertial flywheel 32 by a simple equation of the type:

$$F_V = \frac{1}{2\pi}\sqrt{\frac{K}{I}}$$

The filtering mechanism must be matched to the torque fluctuations that are supposed to be attenuated. As it happens, it is known that the main frequency of acyclic irregularity of an engine depends on the type of engine 12 and especially on the number of cylinders. Thus, for a four-stroke engine 12 and thus one ignition per cylinder every two revolutions of crankshaft 14, the main acyclic irregularity frequency $F_M$ generally corresponds to the frequency of ignition of the cylinders, i.e., for an N-cylinder engine and for a given speed of revolution ω of crankshaft 14, to:

$$F_M = \frac{\omega}{2}N$$

By matching the resonance frequency of oscillation of vibration damper 30 to the main acyclic irregularity frequency $F_M(\omega)$ of engine 12, it is possible, for a range of speeds of revolution, for vibration damper 30 to beat in phase opposition relative to the acyclic irregularities, leading to a large attenuation of the vibratory level. Rotating member 26 connected to crankshaft 14 is therefore subjected to antagonistic torques in phase opposition that compensate one another at least partly, i.e. on the one hand an input acyclic torque originating from crankshaft 14, and on the other hand an oscillating torque transmitted by connecting modules 34. To obtain the desired matching between the resonance frequency of oscillation of vibration damper 30 and the main acyclic irregularity frequency, the possibility that connecting module 34 according to the invention offers is advantageously used to vary, by means of the profile of the cam tracks, the law relating the angular displacement θ between the two rotating members 26, 32 and the transmitted torque.

In this particular case, a value $\omega_0$ is defined in the range of speeds of revolution between $\omega_{min}$ and $\omega_{max}$, such that the main acyclic irregularity frequency of the engine coincides with the resonance oscillation frequency Fv of vibration damper 30, as expressed by:

$$\frac{1}{2\pi}\sqrt{\left|\frac{\Gamma_R}{\theta \cdot \omega^2 \cdot I}\right|} = \frac{\omega_0}{2}N$$

Vibration damper 30 does not permit this perfect equality to be obtained for the entire range of speeds of revolution between $\omega_{min}$ and $\omega_{max}$, and the observed divergence increases with distance from the matching value $\omega_0$. In this sense, vibration damper 30 is less efficient than an oscillating pendulum. Nevertheless, the vibration-attenuation performance remains very interesting and is obtained with particularly simple means.

Figure 5:
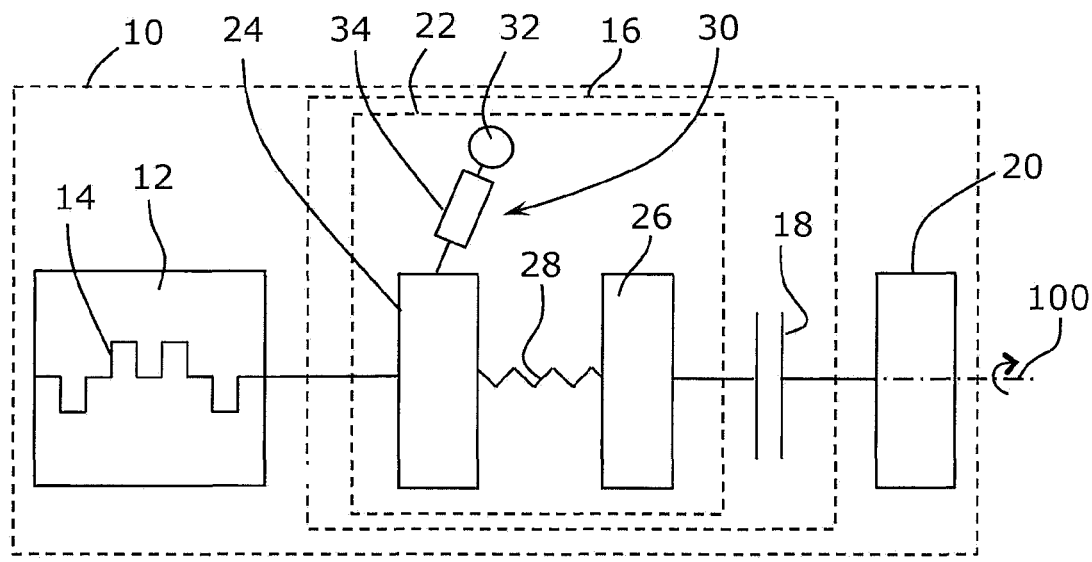
FIG. 5 illustrates a schematic view of a propulsion assembly according to another embodiment of the invention.
Figure 6:
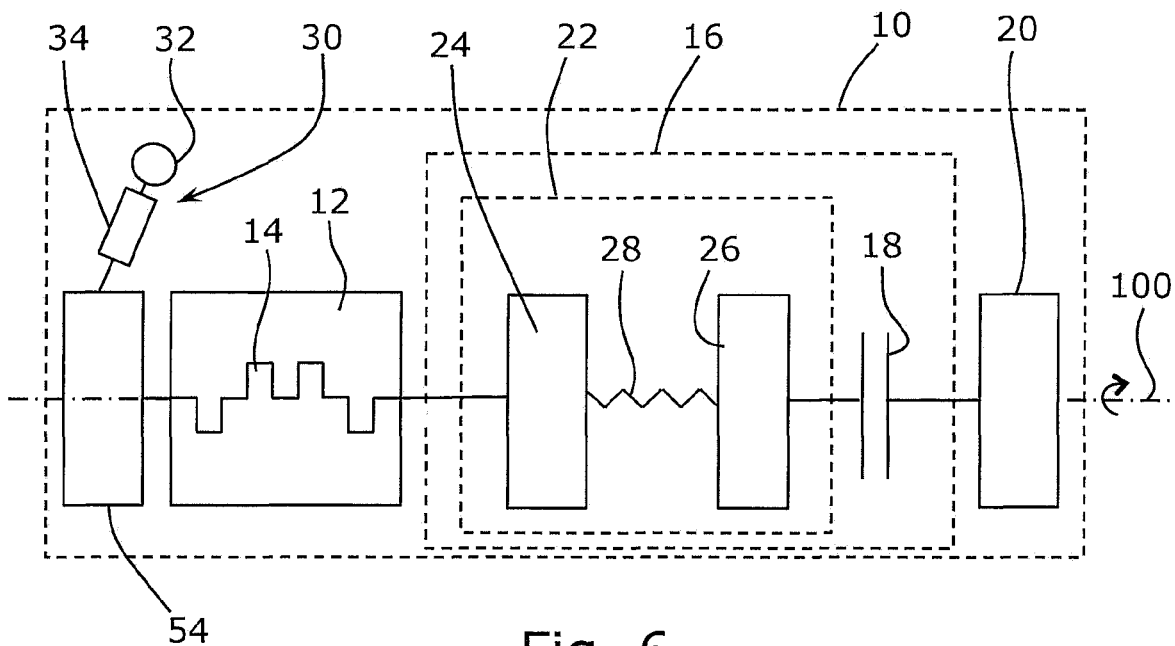
FIG. 6 illustrates a schematic view of a propulsion assembly according to another embodiment of the invention.
Figure 7:
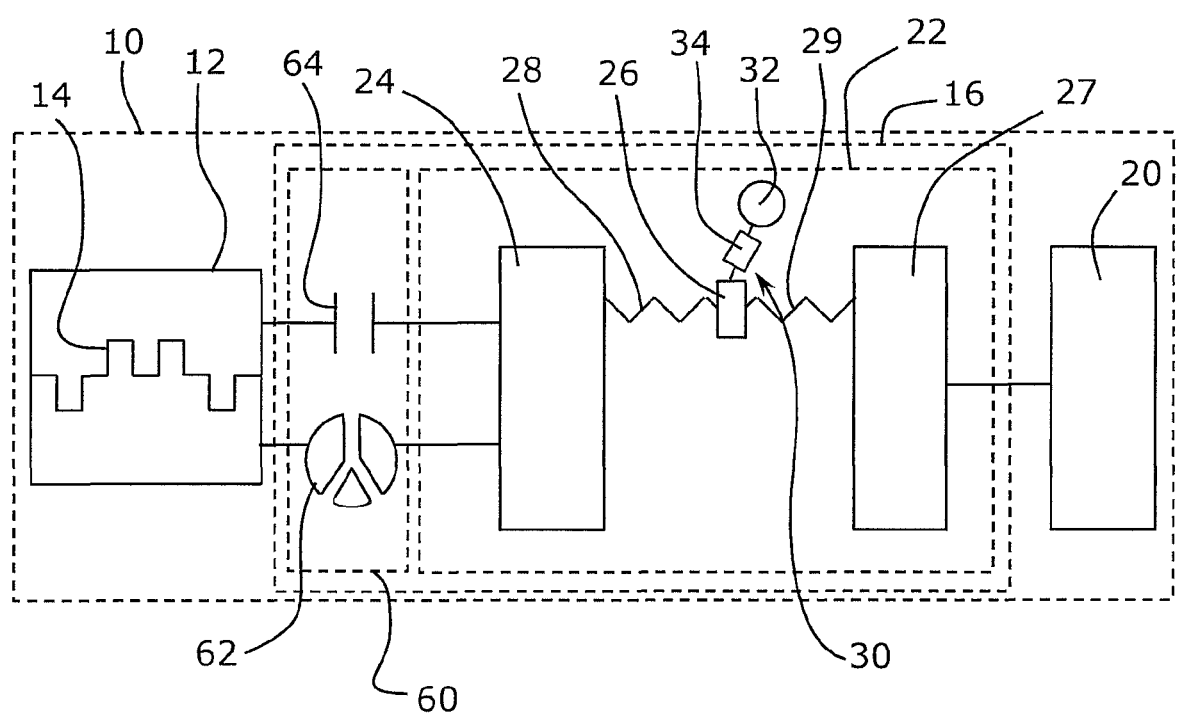
FIG. 7 illustrates a schematic view of a propulsion assembly according to another embodiment of the invention.

Vibration damper 30 according to the invention may be disposed at different positions in propulsion assembly 10, as illustrated, for example, in FIGS. 5 to 7.

FIG. 5 schematically shows a vibration damper 30 according to the invention, mounted in branched manner on a primary flywheel 24 of a double damping flywheel 22.

FIG. 6 illustrates an autonomous vibration damper 30 mounted directly on crankshaft 14 of internal combustion engine 12, in the present case at an end of crankshaft 14 opposite clutch 18.

FIG. 7 schematically illustrates a motor-vehicle propulsion assembly 10 provided with an internal combustion engine 12 and a kinematic transmission train 16 provided with a torque converter 60 situated between a crankshaft 14 of internal combustion engine 12 and a gearbox input shaft 20. This torque converted 60 is provided in a way known in itself with a hydrokinetic converter 62 and a locking clutch 64 disposed in parallel between crankshaft 14 and an input member 24 of a damping mechanism 22, the output member 27 of which is integral with gearbox input shaft 20. An intermediate phasing member 26 is interposed in series between input member 24 and output member 27, connected to input member 24 by a first resilient member 28 and to output member 27 by a second resilient member 29. This intermediate member is additionally connected to oscillating inertial flywheel 32 by way of connecting modules 34 forming an oscillating mechanism.

Figure 8:
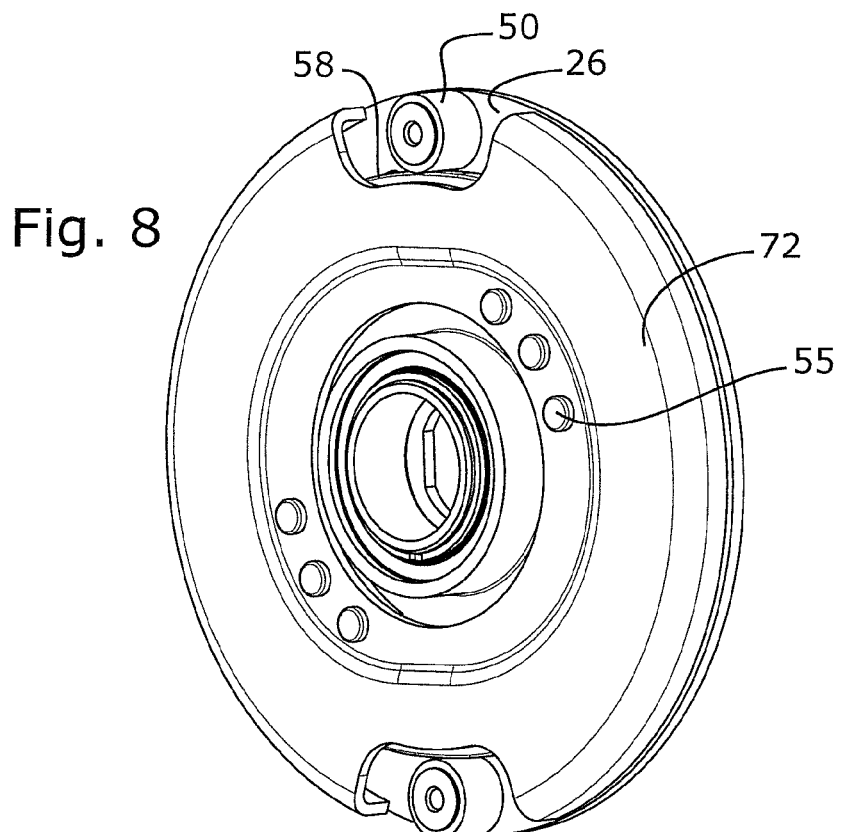
FIG. 8 illustrates a view in perspective of a vibration damper according to another embodiment of the invention.
Figure 9:
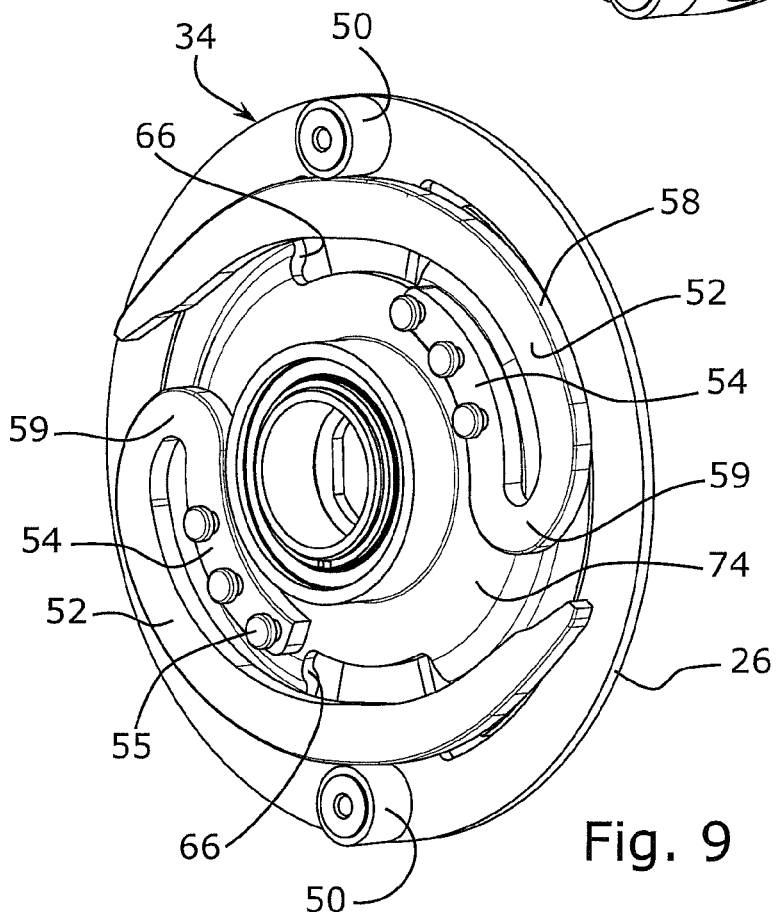
FIG. 9 illustrates a view in perspective of an interior part of the vibration damper of FIG. 8.
Figure 10:
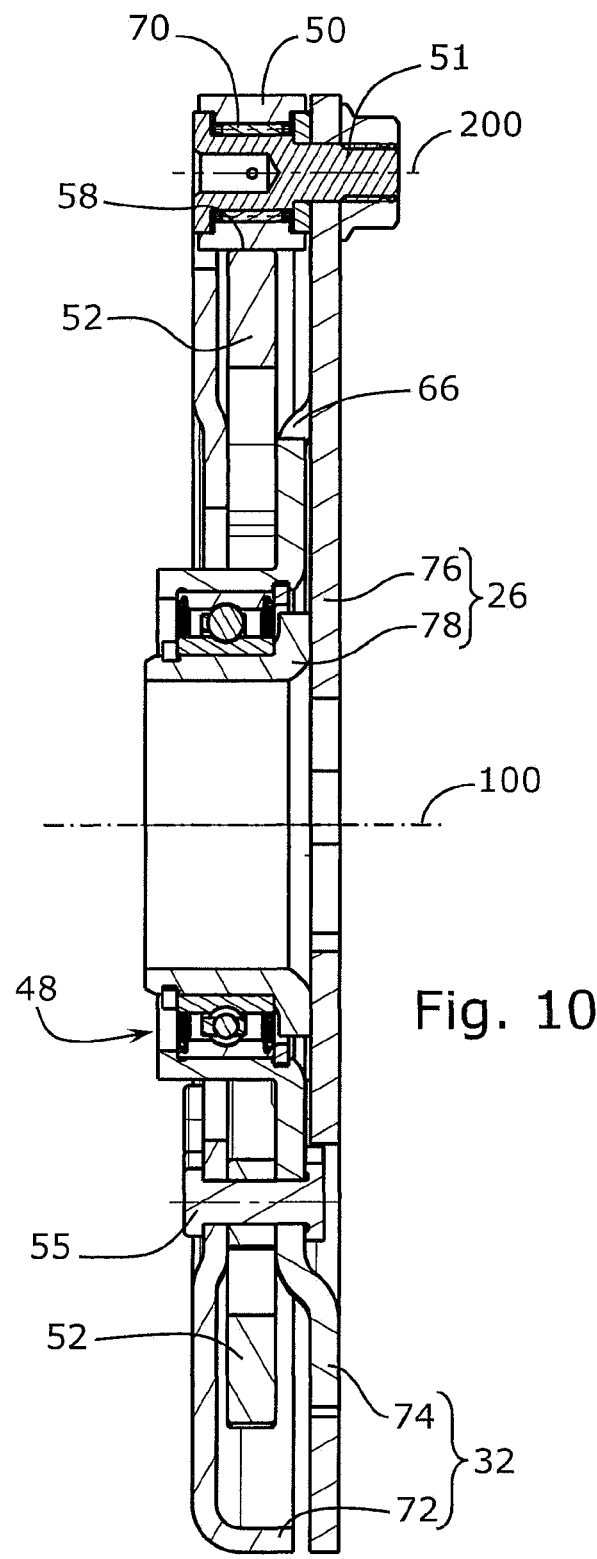
FIG. 10 illustrates a view in section of the vibration damper of FIG. 8.

FIGS. 8 to 10 illustrate a vibration damper 30 according to another embodiment of the invention, adapted, for example, to an autonomous mounting arrangement such as envisioned in FIG. 6, or to a mounting arrangement between a double damping flywheel 22 and a friction clutch 18. This mechanism is provided with a first rotating member 26 around an axis of revolution 100, a second rotating member 32 around axis of revolution 100, a guide roller bearing 48 between first rotating member 26 and second rotating member 32, two connecting members 34 permitting a relative angular displacement between the two rotating members 26, 32 and stops 66 limiting this relative angular displacement.

In a manner similar to the first embodiment, each connecting module 34 is provided with a roller 50 rolling on a cam track 58 formed on a resilient strip 52. Roller 50 is mounted here on first rotating member 26 in such a way that it is able to rotate freely around an axis of rotation 200 parallel to axis of revolution 100 and is situated at a distance from axis of revolution 100, wherein axis of rotation 200 is materialized by a rod 51 and by a sliding or roller bearing 70 interposed between rod 51 and roller 50. Resilient strip 52 has a shape curved back on itself as a U, one branch of which constitutes an end portion 54 fixed to second rotating member 32 and the other branch of which forms cam track 58, wherein both branches 54, 58 are connected by a deformable bent part 59 curved back on itself. Second rotating member 32 here is in two pieces 72, 74, between which resilient strips 52 are disposed, wherein the two pieces 72, 74 are fixed to one another by rivets 55 passing through resilient strips 52. First rotating member 26 itself is formed by a flywheel 76, on which a sleeve 78 is welded, wherein guide bearing 48 is fitted onto sleeve 78 and in a tubular part of piece 74 of second rotating member 32. Stops 66 are constituted by surfaces of the two rotating members 26, 32, which come into contact when the limit of relative angular displacement between the two rotating members 26, 32 is reached. These stops are formed on the one hand by an axial extension of one of the pieces of second rotating member 32 rotating around axis 100 and on the other hand by the upturned edge of a window of first rotating member 26.

FIGS. 11 to 13 illustrate a vibration damper 30 according to another embodiment of the invention. This is a double damping flywheel structure. The member to be damped is secondary inertial flywheel 42 of the double damping flywheel. Secondary flywheel carries two rollers 50. The vibration damper is provided with two flexible strips 52a and 52b, each equipped with a cam track 58, and with a flexible portion 59 capable of flexing in order to ensure resilient bracing of cam track 58 against a corresponding roller 50.

This embodiment is distinguished from that represented in FIGS. 2 to 4 by the method of fixation of strips 52a and 52b on inertial flywheel 32.

According to this embodiment, the inertial flywheel is provided with an annular sheet-metal plate 83 and an inertial ring gear 65 fixed radially on the exterior of this annular sheet-metal plate. Annular sheet-metal plate 83 is disposed in a plane perpendicular to axis of rotation 100. In this case, strips 52a and 52b and the annular sheet-metal plate are formed in a single piece.

In fact, the flexible portion of the flexible strips is formed by means of a cut made in the annular sheet-metal plate. This cut makes it possible to obtain the exterior contour of flexible portions 58 of strips 52a and 52b. The strips are connected to the annular sheet-metal plate by way of a base 85.

In this case, each base 85 is stamped in such a way that each strip 52a and 52b is offset axially relative to annular sheet-metal plate 83 of inertial flywheel 32. Thus, by virtue of base 85, each strip 52a, 52b is capable of flexing in a plane parallel to the plane in which annular sheet-metal plate 83 is disposed. Thus the cut made to form the flexible strip portion is able globally to follow the shape that is supposed to be given to the strip. Removal of material, also performed by cutting, may be carried out in the annular sheet-metal plate around the junction zone between the base and the flexible portion of strips 52a and 52b in such a way as to favor stamping.

Plate 83 is also stamped radially toward the interior, in such a way as to form a mounting skirt 87. A bearing 48 arranged between this mounting skirt 87 and a hub of secondary inertial flywheel 42 ensures that inertial flywheel 32 can be mounted with the ability to rotate relative to secondary inertial flywheel 42.

Thus, with this embodiment, the manufacture of strips is simplified and it is no longer necessary to resort to assembly means.

FIGS. 14 to 16 illustrate a vibration damper 30 according to another embodiment of the invention. This is a double damping flywheel structure. The member to be damped is secondary inertial flywheel 42 of the double damping flywheel. The secondary flywheel carries two cam followers such as rollers 50. The vibration damper is provided with two flexible strips 52a and 52b, each equipped with a cam track 58, and with a flexible portion 59 capable of flexing in order to ensure resilient bracing of cam track 58 against a corresponding roller 50.

This embodiment is distinguished from that represented in FIGS. 11 to 13 by the method of production of strips 52a and 52b on inertial flywheel 32.

In this case, strips 52a and 52b and annular sheet-metal plate 83 again are formed in a single piece. However, the strips are capable of flexing in the same plane as the plane in which annular sheet-metal plate 83 is disposed.

Consequently, an indentation 88a is required radially on the exterior of the flexible portion of each strip in such a way as to permit the displacement of a roller on cam track 58 of each strip 52a, 52b.

Similarly, another indentation 88b is required radially on the interior of the flexible portion of each strip, in such a way as to permit a radial displacement of the strip in the direction of axis 100 when cam roller 50 is displaced on cam track 58.

Figure 17:
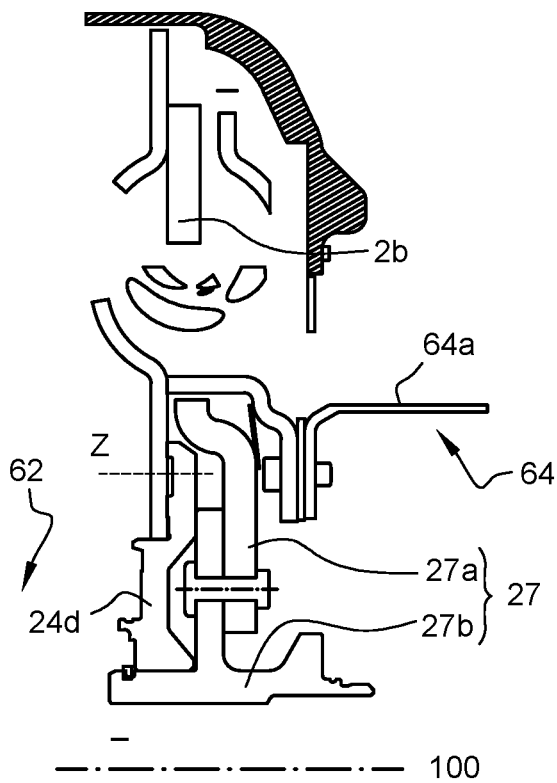
FIGS. 17 to 19 present another embodiment.
Figure 17:
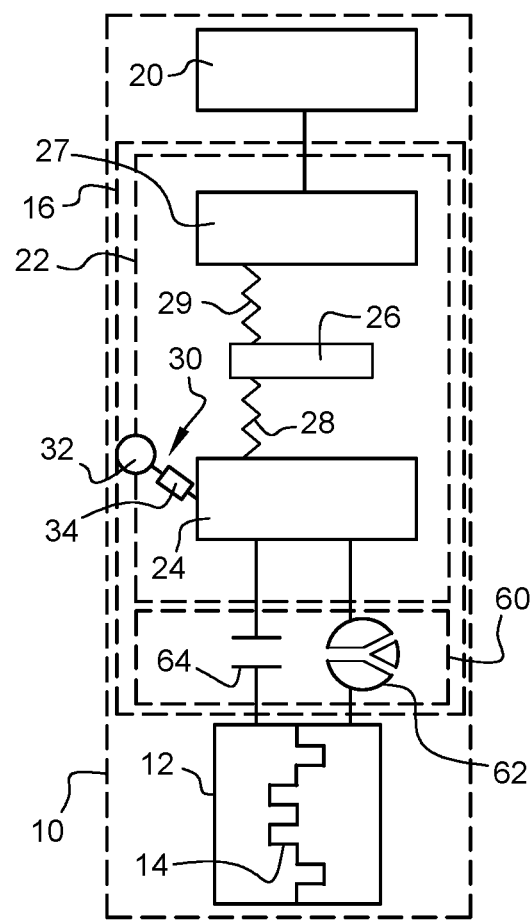

FIG. 17 schematically illustrates a motor-vehicle propulsion assembly 10 provided with an internal combustion engine 12 and a kinematic transmission train 16 provided with a torque converter 60 situated between a crankshaft 14 of internal combustion engine 12 and a gearbox input shaft 20. This torque converter 60 is provided in a way known in itself with a hydrokinetic converter 62 and a locking clutch 64 disposed in parallel between crankshaft 14 and an input member 24 of a damping mechanism 22, the output member 27 of which is integral with gearbox input shaft 20. An intermediate phasing member 26 is interposed in series between input member 24 and output member 27, connected to input member 24 by a first resilient member 28 and to output member 27 by a second resilient member 29.

In this case, the vibration damper is therefore integrated in a torque converter 60. Here, input member 24 is connected to oscillating inertial flywheel 32 by way of connecting modules 34, which together form an oscillating mechanism.

Figure 18:
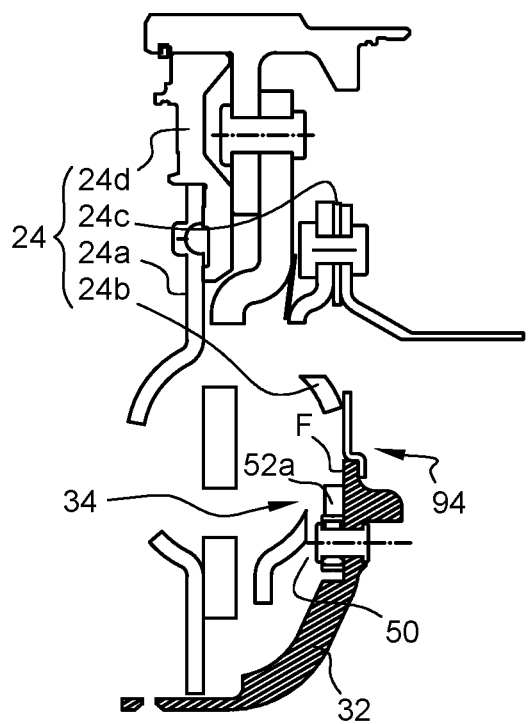
Figure 19:
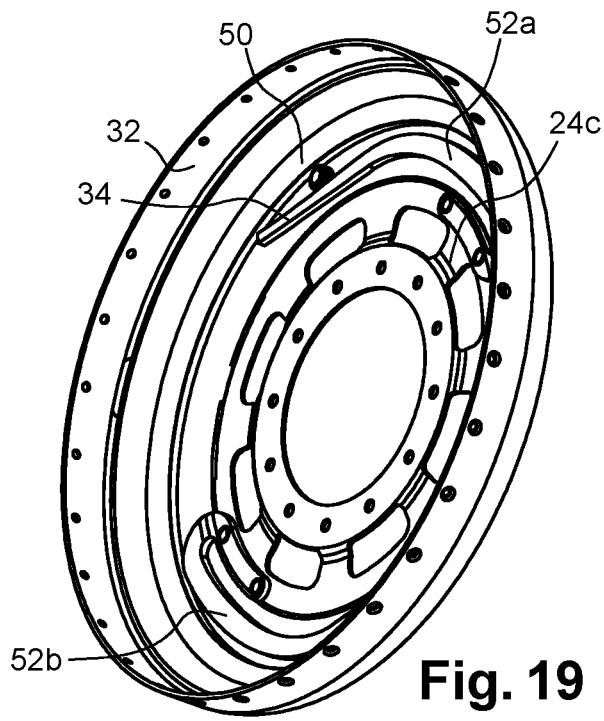

FIGS. 18 and 19 represent a first variant of this embodiment, in which input member 24 carries two flexible strips, each equipped with a cam track 58. Two rollers 50 are mounted rotationally on an inertial flywheel 32. These rollers may be mounted to move rotationally around a rod fixed on oscillating inertial flywheel 32, via a sliding or roller bearing.

On the one hand, input member 24 is composed of guide disks 24a and 24b arranged axially on the two sides of springs 28 and 29.

On the other hand, input member 24 is composed on a support element 24c formed in a sheet-metal plate. This sheet-metal support plate 24c carries connecting modules 34. Resilient strips 52a and 52b of the module are mounted on sheet-metal support plate 24c.

In addition, input member 24 is composed of turbine hub 24d. Turbine hub 24d and first guide disk 24a are joined together, especially by means of a mounting member such as a rivet, which can be mounted along axis Z.

On the other hand, sheet-metal support plate 24c is fixed on second guide disk 24b. Sheet-metal support plate 24c is likewise fixed on a connecting piece 64a of locking clutch 64. In this variant, sheet-metal support plate 24c is sandwiched between connecting piece 64a of locking clutch 64 and second guide disk 24b. Connecting piece 64a of locking clutch 64, second guide disk 24b and sheet-metal support element 24c are assembled together with fixation means such as rivets.

The vibration damper is provided with a circular centering zone F around axis of rotation 100, which ensures centering of inertial flywheel 32 on sheet-metal support plate 24c. For this purpose, radially external rim 94 of sheet-metal support plate 24c is bent over to form a surface for cooperation with inertial flywheel 32. The radially external rim of sheet-metal support plate 24c forms a baffle 94 forming on the one hand a cylindrical friction surface and on the other hand an axial retaining element.

Guide disks 24a and 24b are fixed to rotate with one another by virtue of an axially extending connecting lug.

At the output, an output shroud 27a braced against springs 29 is fixed on an output hub 27b capable of driving a gearbox input shaft.

Advantageously, the inertial flywheel has a pot shape and the springs and the guide disks are arranged in the interior of this pot.

In a second variant, not illustrated, of this embodiment, the strips may be fixed on the inertial flywheel and the rollers may be mounted to move rotationally on the support element.

In another embodiment, illustrated in FIGS. 20 and 21, the vibration damper is integrated in a torque-converter output member. Output member 27 is connected to an oscillating inertial flywheel 32 by way of connecting modules 34, which together form an oscillating mechanism.

FIGS. 20 and 21 represent a first variant of this embodiment, in which output member 27 carries two cam followers, such as rollers 50. Two flexible strips 52a and 52b, each equipped with a cam track 58, are mounted on inertial flywheel 32.

On the one hand, output member 27 is composed of an output shroud 27a braced against springs 29 and of an output hub 27b. The springs are circumferentially interposed between input member 24, formed by guide disks, and output shroud 27a.

On the other hand, the output member is composed on a support element 27c formed in a sheet-metal plate. This sheet-metal support plate 27c carries connecting modules 34. Rollers 50 of the module are mounted to move rotationally on this sheet-metal support plate 27c.

Sheet-metal support plate 27c is therefore mounted to rotate with output shroud 27a and with output hub 27b.

Sheet-metal support plate 27c is likewise mounted to rotate with turbine T. In this variant, sheet-metal support plate 27c is sandwiched between one among turbine T and output hub 27b on the one hand and output shroud 27a on the other hand. In the illustrated variant, sheet-metal support plate 27c is sandwiched between turbine T and output hub 27b, and turbine T is sandwiched between sheet-metal support plate 27c and the output hub. Turbine T, output shroud 27a, output hub 27b and sheet-metal support plate 27c are riveted together with common fixation means such as rivets.

The vibration damper is provided with a circular centering zone F around axis of rotation 100, which ensures centering of inertial flywheel 32 on sheet-metal support plate 24c. For this purpose, radially external rim 94 of sheet-metal support plate 24c is bent over to form a surface for cooperation with inertial flywheel 32. Radially external rim 94 of sheet-metal support plate 24c forms a baffle 94 forming on the one hand a cylindrical friction surface and on the other hand an axial retaining element.

In a second variant, not illustrated, of this embodiment, the rollers may be fixed on the inertial flywheel and the strips may be mounted on the support element.

Within the context of a torque converter, the cam followers may also be realized in the form of bosses capable of being displaced along the cam track.

Of course, the examples represented in the figures and discussed hereinabove are provided only by way of illustration and are not limitative. It is explicitly provided that the different embodiments illustrated may be combined with one another in order to propose further embodiments. Cam track 58 and roller 50 may smooth or toothed, to ensure engagement of the rack and pinion type. Roller 50 may be unconstrained and may roll on cam track 58 formed on resilient strip 52 connected to one of the rotating members 26, 32 and another cam track 58 formed on the other rotating member, wherein the two cam tracks are facing one another, wherein cam track 58 formed on resilient strip 52 is disposed radially in the interior of the other cam track 58.

Similarly, other strip shapes and geometries may be employed to realize the present invention.

The invention claimed is:

1. A vibration damper, of inertial beater type, comprising:
two rotating members guided rotationally around an axis of revolution, wherein one of the two rotating members is an inertial flywheel oscillating around the axis of revolution and the other of the two rotating members is a member to be damped, wherein the member to be damped is arranged to be driven by a torque following a torque path between a driving member and a driven member, wherein the inertial flywheel is arranged to be connected kinematically to the torque path between the driving member and the driven member solely by way of the member to be damped; and
one or more connecting modules between the two rotating members, permitting a relative angular displacement θ between the two rotating members around the axis of revolution on the two sides of a reference relative angular position,
wherein each connecting module includes:
a roller associated with a first of the two rotating members, and
a cam track connected resiliently by a resilient element to a second of the two rotating members, and
wherein the resilient element is capable of being deformed to ensure resilient bracing of the cam track against the roller, thus permitting the roller to roll over the cam track when the two rotating members are rotating relative to one another on the two sides of the reference position.

2. A vibration damper according to claim 1, wherein the resilient element is arranged such that the stiffness of the resilient element increases when the speed of rotation of the vibration damper increases.

3. A vibration damper according to claim 1, wherein a resilient strip constitutes the resilient element, the resilient strip including
   a fixation portion fixed on the second of the two rotating members, and
   a flexible portion capable of flexing to ensure resilient bracing of the cam track against the roller, thus permitting the roller to roll over the cam track when the two rotating members are rotating relative to one another on the two sides of the reference position.

4. A vibration damper according to claim 3, wherein the flexible portion includes an intermediate deformation portion connecting the fixation portion to the cam track.

5. A vibration damper according to claim 4, wherein the intermediate deformation portion is U-shaped in a plane perpendicular to the axis of revolution.

6. A vibration damper according to claim 4, wherein the flexible portion is circumferentially curved around the axis of rotation extending up to a free end arranged to be displaced with a radial component when the two rotating members are rotating relative to one another.

7. A vibration damper according to claim 1, wherein the cam track is turned radially toward the exterior and toward the roller.

8. A vibration damper according to claim 1, wherein the resilient element is arranged in such a way as to permit displacement of the cam track having a radial component when the two rotating members are rotating relative to one another.

9. A vibration damper according to claim 1, wherein the roller is a roller pivoting around an axis of rotation fixed relative to the first rotating member.

10. A vibration damper according to claim 1, wherein a stop limits the angular displacement between the two rotating members.

11. A vibration damper according to claim 1, wherein the one or more connecting modules include at least two connecting modules disposed symmetrically relative to the axis of revolution.

12. A vibration damper according to claim 1, wherein in the reference relative position, the roller is braced against a zone of the cam track orthoradial relative to the reference axis.

13. A vibration damper according to claim 1, wherein the connecting module or modules are such that, when the member to be damped is rotating at a speed of revolution ω, the connecting module or modules generate together, between the two rotating members, a resultant torque $\Gamma_R$ of restoration toward the reference position, which is a function of the angular displacement θ between the two rotating members and of the speed of revolution co, and such that:

$$\frac{3}{4}C \le \left| \frac{\Gamma_R}{\theta \cdot \omega^2} \right| \le \frac{5}{4}C$$

where C is a positive constant, given when the speed of revolution ω varies in a speed range between a predetermined minimal value ωmin below 1000 rpm and a predetermined maximal value ωmax higher than 1500 rpm.

14. A damping mechanism comprising:
an input member;
an output member connected by a kinematic torque-transmission train; and
a vibration damper according to claim 1,
wherein the member to be damped is constituted by the input member, the output member or an element of the kinematic transmission train between the input member and the output member, wherein the oscillating flywheel is disposed in branched manner relative to the kinematic torque-transmission train.

15. A torque converter comprising a vibration damper according to claim 1.

16. A torque converter, comprising:
a vibration damper of the inertial beater type, the vibration damper including:
   two rotating members guided rotationally around an axis of revolution, wherein one of the two rotating members is an inertial flywheel oscillating around the axis of revolution and the other of the two rotating members is a member to be damped, wherein the member to be damped is arranged to be driven by a torque following a torque path between a driving member and a driven member, wherein the inertial flywheel is arranged to be connected kinematically to the torque path between the driving member and the driven member solely by way of the member to be damped; and
   one or more connecting modules between the two rotating members, permitting a relative angular displacement θ between the two members rotating around the axis of revolution on the two sides of a reference relative angular position, wherein each connecting module includes:
a cam follower associated with a first of the two rotating members, and
a cam track connected resiliently by a resilient element to a second of the two rotating members, wherein the resilient element is capable of being deformed to ensure resilient bracing of the cam track against the cam follower, thus permitting the cam follower to be displaced over the cam track when the two rotating members are rotating relative to one another on the two sides of the reference position.

17. A torque converter according to claim 16, wherein
the torque converter includes springs arranged between an input member and an output member, and
the member to be damped is the input member.

18. A torque converter according to claim 16, wherein
the torque converter includes springs arranged between an input member and an output member, and
the member to be damped is the output member.

19. A torque converter according to claim 16, wherein the cam follower is a roller mounted to move rotationally while rolling on the cam track or a roller arranged between the cam track and the first rotating member in order to roll both on the cam track and the first rotating member when the two rotating members are rotating relative to one another.

* * * * *